United States Patent
Fu

(10) Patent No.: US 9,862,414 B2
(45) Date of Patent: Jan. 9, 2018

(54) METHOD AND DEVICE FOR COMPENSATING A STEERING WHEEL ANGLE SIGNAL, WHICH IS SUBJECT TO AN OFFSET, IN A VEHICLE

(71) Applicant: Robert Bosch GmbH, Stuttgart (DE)

(72) Inventor: Chengxuan Fu, Kirchheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/969,626

(22) Filed: Dec. 15, 2015

(65) Prior Publication Data
US 2016/0167708 A1 Jun. 16, 2016

(30) Foreign Application Priority Data
Dec. 16, 2014 (DE) ................ 10 2014 226 080

(51) Int. Cl.
*B62D 15/02* (2006.01)
*B60W 50/14* (2012.01)

(52) U.S. Cl.
CPC ........ *B62D 15/0245* (2013.01); *B60W 50/14* (2013.01); *B60W 2520/14* (2013.01); *B60W 2550/402* (2013.01)

(58) Field of Classification Search
CPC ....... B60W 2520/14; B60W 2550/402; B60W 50/14; B62D 15/0245
See application file for complete search history.

(56) References Cited

U.S. PATENT DOCUMENTS

| | | | |
|---|---|---|---|
| 2001/0003436 A1* | 6/2001 | Yoshikawa | B60K 28/066 340/439 |
| 2007/0203627 A1* | 8/2007 | Bolzmann | B62D 15/0245 701/41 |
| 2010/0030428 A1* | 2/2010 | Gartner | G01D 5/2451 701/42 |
| 2010/0104139 A1* | 4/2010 | Kuehnle | G06K 9/00798 382/106 |
| 2011/0029184 A1* | 2/2011 | Brighenti | B60W 30/0953 701/31.4 |
| 2013/0332030 A1* | 12/2013 | Koukes | B60T 8/171 701/41 |

* cited by examiner

*Primary Examiner* — Thomas Ingram
(74) *Attorney, Agent, or Firm* — Norton Rose Fulbright US LLP; Gerard Messina

(57) ABSTRACT

A method for compensating a steering wheel angle signal, which is subject to an offset, in a vehicle, includes: a filtering step; and a use step. In the filtering step, the steering wheel angle signal is filtered while the vehicle is traveling, using a filtering rule, in order to obtain a mean value of the steering wheel angle signal. The steering wheel angle signal is filtered if a lane and/or a roadway of the vehicle meets predetermined criteria. In the use step, the mean value is used to compensate the offset.

13 Claims, 1 Drawing Sheet

METHOD AND DEVICE FOR COMPENSATING A STEERING WHEEL ANGLE SIGNAL, WHICH IS SUBJECT TO AN OFFSET, IN A VEHICLE

BACKGROUND OF THE INVENTION

1. Field of the Invention

The present invention relates to a method for compensating a steering wheel angle signal, which is subject to an offset, in a vehicle, to a corresponding device and to a corresponding computer program.

2. Description of the Related Art

A steering wheel angle signal portrays an angle position of a steering wheel of a vehicle. The steering wheel angle signal may be used for safety-relevant functions of the vehicle. If the steering wheel angle signal has an offset, it will be assumed in an electronics system of the vehicle that the steering turned even though the steering wheel is in a different angle position.

BRIEF SUMMARY OF THE INVENTION

Against this background, the concept presented here provides a method for compensating a steering wheel angle signal, which is subject to an offset, in a vehicle, and also a device which uses this method and finally a corresponding computer program.

In order to be able to compensate an offset of the steering wheel angle signal, a reference angle position is required. For this purpose, use may be made of the fact that a vehicle will have a middle steering angle position when averaged over a relatively long period of time, since steering movements to the right and to the left compensate each other or may cancel each other out by addition. If a steering angle sensor has an offset, the vehicle appears to take more turns in one direction than in the other direction over the relatively long period of time, even though this is not likely. Nevertheless, every steering movement influences a mean value of the steering angle.

If deflections of the steering angle above a threshold are ignored, a stable mean value will be formed more quickly. The deflections to be filtered out may be detected via a camera-based lane detection system. The lane detection system is independent of the steering of the vehicle. Therefore, no system error would have an effect.

A method for compensating a steering wheel angle signal, which is subject to an offset, in a vehicle is provided, the method including the following steps:

filtering the steering wheel angle signal while the vehicle is traveling, using a filtering rule, in order to obtain a mean value of the steering wheel angle signal, the steering wheel angle signal being filtered if a lane along which the vehicle is to travel and/or a roadway along which the vehicle is to travel meet(s) at least one predetermined criterion; and using the mean value to compensate for the offset.

An offset may be understood to mean a permanent or long-term shift in a value of the steering wheel angle signal. A filtering rule may be a calculation rule or a processing rule. In particular, the steering wheel angle signal may be added up. The at least one criterion may identify a road as acceptable. In particular, the road or roadway may have only a few turns. The criteria may also identify driving maneuvers as acceptable or unacceptable. In particular, driving maneuvers involving few turns may be acceptable. The criteria may be obtained using a camera-based surroundings detection system. In particular, processing rules may be used to detect the roadway and/or lane. A lane may be understood to mean a driving trajectory along which the vehicle would travel with the wheels in the present position. During use, the mean value or a result of the filtering may be subtracted from the steering wheel angle signal.

The steering wheel angle signal may be filtered if the roadway is detected as being curved to a lesser extent than a curvature limiting value. As a result, large deflections of the steering wheel angle are filtered out directly.

The roadway may be detected as being curved to a lesser extent than the curvature limiting value if a right-hand curvature of a right-hand roadway boundary and a left-hand curvature of a left-hand roadway boundary are smaller than the curvature limiting value. Roadway boundaries may be detected easily and provide a good clue as to where the vehicle will be expected to travel.

The steering wheel angle signal may be filtered if a yaw angle between the lane and the roadway is detected as being smaller than a yaw angle limiting value. As a result, overtaking maneuvers, for example, may be filtered out directly.

The yaw angle may be detected as being smaller than the yaw angle limiting value if a right-hand yaw angle difference between the lane and the right-hand roadway boundary and a left-hand yaw angle difference between the lane and the left-hand roadway boundary are smaller than the yaw angle limiting value. The camera of the surroundings detection device is fastened to the vehicle at a fixed angle. A vehicle longitudinal axis may therefore be projected onto images from the camera. An expected lane of the vehicle may thus be determined.

The steering wheel angle signal may be filtered using a low-pass filter in order to obtain the mean value. With a low-pass filter, high frequencies may be blocked. As a result, rapid steering movements may have no effect on the mean value.

The mean value may be used after the steering wheel angle signal has been filtered over more than a minimum driving distance of the vehicle. By virtue of a minimum driving distance, it may be assumed with high probability that the mean value represents a steering angle of the vehicle when driving straight ahead.

The concept presented here also provides a device which is designed to carry out, trigger or implement, in suitable units, the steps of a variant of a method presented here. The object on which the present invention is based may also be achieved quickly and efficiently by this embodiment variant of the present invention in the form of a device.

In the present case, a device may be understood to mean an item of electrical equipment which processes sensor signals and outputs control signals and/or data signals as a function thereof. The device may have an interface which may be provided as hardware and/or software. In a hardware design, the interfaces may be, for example, part of a so-called system ASIC which contains a wide range of functions of the device. However, it is also possible that the interfaces are dedicated integrated circuits or may be made up at least partially of discrete components. In a software design, the interfaces may be software modules which are present, for example, on a microcontroller alongside other software modules.

Also of advantage is a computer program product or computer program including program code which may be stored on a machine-readable carrier or storage medium, such as a semiconductor memory, a hard drive memory or an optical memory, and is used to carry out, implement and/or trigger the steps of the method according to one of the specific embodiments described above, in particular when the program product or program is executed on a computer or a device.

The concept presented here will be explained in greater detail below by way of example and with reference to the appended drawings.

DETAILED DESCRIPTION OF THE INVENTION

Figure 1:
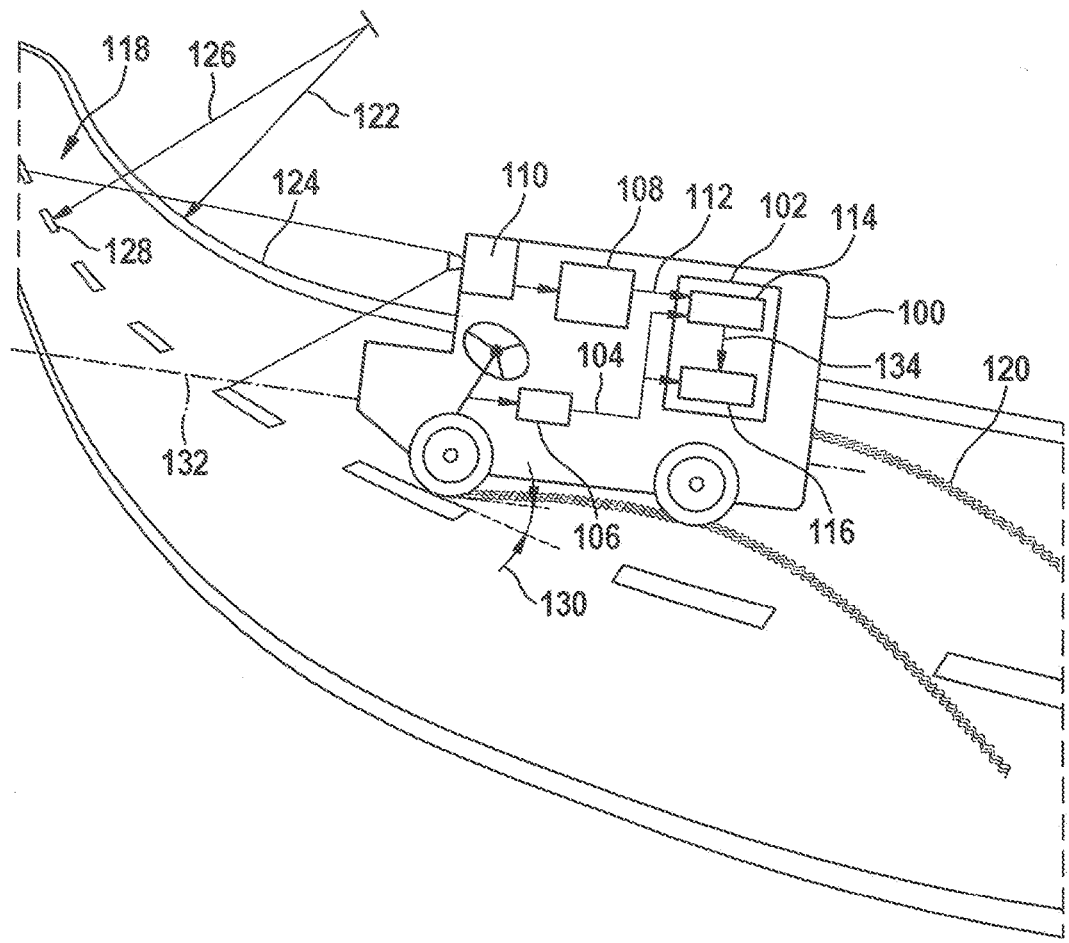
FIG. 1 shows a representation of a vehicle including a device for compensating a steering wheel angle signal, which is subject to an offset, according to one exemplary embodiment of the present invention.

In the following description of advantageous exemplary embodiments of the present invention, identical or similar reference numerals will be used for the similarly acting elements shown in the various figures, a repeated description of these elements being omitted.

FIG. 1 shows a representation of a vehicle 100 including a device 102 for compensating a steering wheel angle signal 104, which is subject to an offset, according to one exemplary embodiment of the present invention. Vehicle 100 has a steering wheel angle sensor 106. Steering wheel angle sensor 106 portrays an angle position of a steering wheel of the vehicle in an electrical signal, steering wheel angle signal 104. The steering wheel angle signal may be subject to an offset. The offset feigns a non-existent turning of the steering wheel. Although the steering wheel is in a middle position, for example, steering wheel angle signal 104 with the offset has a value which represents an angle position relative to the middle position.

Vehicle 100 also has a video-based surroundings monitoring device 108. Surroundings monitoring device 108 is connected to a video camera 110 which detects the surroundings of vehicle 100 ahead of vehicle 100. Surroundings monitoring device 108 analyzes images from camera 110 in order to obtain information 112 about the surroundings.

Device 112 has a filter unit 114 for filtering steering wheel angle signal 104 and a compensation unit 116 for compensating steering wheel angle signal 104. In filter unit 114, steering wheel angle signal 104 is filtered using a filtering rule if it is discernible from information 112 provided by surroundings detection device 108 that the road or a roadway 118 along which vehicle 100 is traveling, and alternatively or additionally a lane 120 of vehicle 100, meet(s) certain criteria.

In one exemplary embodiment, steering wheel angle signal 104 is filtered only when roadway 118 has a sufficiently large curve radius. In particular, monitoring is carried out to ascertain whether a right-hand radius of curvature 122 of a right-hand roadway boundary 124 is greater than a minimum radius of curvature. Monitoring is also carried out to ascertain whether a left-hand radius of curvature 126 of a left-hand roadway boundary 128 is greater than the minimum radius of curvature.

Furthermore, in one exemplary embodiment, steering wheel angle signal 104 is filtered only when lane 120 of vehicle 100 forms a small enough angle 130 relative to roadway 118. In particular, an alignment of a vehicle longitudinal axis 132 relative to roadway markings 124, 128 is checked.

In filter unit 114, the steering wheel angle signal is filtered, in one exemplary embodiment, by a low-pass filter while vehicle 100 is traveling, so that brief steering movements are filtered out from steering wheel angle signal 104 on account of their speed. After the filtering, a mean value 134 of steering wheel angle signal 104 remains, which represents the offset by which steering wheel angle sensor 106 falsely measures.

In compensation unit 116, steering wheel angle signal 104 is compensated using mean value 134 in order to obtain a compensated steering angle signal (not shown here), for example for safety-relevant applications in vehicle 100.

Steering wheel angle sensor 106 often delivers a steering wheel angle signal 104 which is subject to an offset. This may be attributed, for example, to an installation tolerance of sensor 106 but also to effects of aging. In other words, sensor 106 often delivers an angle signal 104 which has or is a relatively constant and slightly negative or positive value, even though vehicle 100 is traveling straight ahead.

Since for many functions it is necessary that the steering wheel angle is determined in a manner free of any offset, compensation of this offset is necessary.

The previous compensation, which is used for example in the ESP, filters raw signal 104 over a very long period of time or driving distance, using a low-pass filter. Assuming that vehicle 100 is on average traveling straight ahead, filtered value 134 is thus zero.

Until now, the algorithm requires approximately 30 km in order to achieve a first estimate of the offset.

With the aid of a lane detection algorithm LDA 108, the compensation may be accelerated since the instantaneous vehicle movements relative to lane 118, 120 may be taken into account. In addition, it is possible to filter out directly those driving situations which are not helpful to the compensation but rather disrupt the latter. For example, lane changes or drives through tight turns, where the steering wheel deviates greatly from the middle position, may be filtered out.

Figure 2:
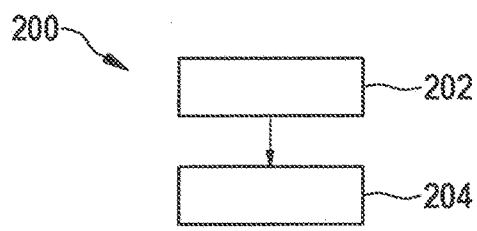
FIG. 2 shows a flow chart of a method for compensating a steering wheel angle signal, which is subject to an offset, according to one exemplary embodiment of the present invention.

FIG. 2 shows a flow chart of a method 200 for compensating a steering wheel angle signal, which is subject to an offset, according to one exemplary embodiment of the present invention. Method 200 may be carried out on a device as shown in FIG. 1. Method 200 includes a filtering step 202 and a use step 204. In filtering step 202, the steering wheel angle signal is filtered while the vehicle is traveling, using a filtering rule, in order to obtain a mean value of the steering wheel angle signal. The steering wheel angle signal is filtered if a lane, and alternatively or additionally a roadway, of the vehicle meet(s) predetermined criteria. In use step 204, the mean value is used to compensate the offset.

In other words, FIG. 2 shows a Steering Wheel Angle Offset Compensation 200 (SWAOC) using Lane Detection Algorithm (LDA).

The Steering Wheel Angle Offset Compensation SWAOC is carried out when these conditions are met:

$abs(\kappa^{LE}) < \kappa_{lim}$
$abs(\kappa^{RI}) < \kappa_{lim}$
$abs(\theta^{LE}) < \theta_{lim}$
$abs(\theta^{RI}) < \theta_{lim}$ Here, $\kappa^{LE}$ is the curvature of the left-hand roadway boundary
$\kappa^{RI}$ is the curvature of the right-hand roadway boundary $\kappa_{lim}$ is the limiting parameter for the curvature, which results in a compensation only when the lane is relatively straight $\theta^{LE}$ is the yaw angle difference of the left-hand roadway boundary $\theta^{RI}$ is the yaw angle difference of the right-hand roadway boundary $\theta_{lim}$ is the limiting parameter for the yaw angle difference, which results in a compensation only when the alignment of the vehicle is relatively parallel to the lane.

The concept presented here is based purely on optical lane detection.

The exemplary embodiments described herein and shown in the figures are selected only by way of example. Different exemplary embodiments may be combined with one another entirely or with respect to individual features. One exemplary embodiment may also be supplemented by features of another exemplary embodiment.

Furthermore, the method steps presented here may be carried out repeatedly and in an order different from the order described.

If an exemplary embodiment includes an "and/or" linkage between a first feature and a second feature, this is to be interpreted to mean that the exemplary embodiment according to one specific embodiment has both the first feature and the second feature and according to another specific embodiment has either only the first feature or only the second feature.

What is claimed is:

1. A method for compensating a steering wheel angle signal, which is subject to an offset, in a vehicle, the method comprising:
   determining whether or not at least one of (i) a lane along which the vehicle is to travel, and (ii) a roadway along which the vehicle is to travel, meets at least one predetermined criteria;
   filtering the steering wheel angle signal while the vehicle is traveling, using a filtering rule, in order to determine a mean value of the steering wheel angle signal, wherein the steering wheel angle signal is filtered and included in the determination of the mean value based on a result of the determining step; and
   using the mean value to compensate the offset of the steering wheel angle signal.

2. The method as recited in claim 1, wherein, in the filtering step, the steering wheel angle signal is filtered and included in the determination of the mean value if the roadway is detected as being curved to a lesser extent than a predefined curvature limiting value.

3. The method as recited in claim 2, wherein, in the filtering step, the roadway is detected as being curved to a lesser extent than the predefined curvature limiting value if a right-hand curvature of a right-hand roadway boundary and a left-hand curvature of a left-hand roadway boundary are smaller than the predefined curvature limiting value.

4. The method as recited in claim 1, wherein, in the filtering step, the steering wheel angle signal is filtered and included in the determination of the mean value if a yaw angle between the lane and the roadway is detected as being smaller than a predefined yaw angle limiting value.

5. The method as recited in claim 4, wherein, in the filtering step, the yaw angle is detected as being smaller than the predefined yaw angle limiting value if (i) a right-hand yaw angle difference between the lane and the right-hand roadway boundary and (ii) a left-hand yaw angle difference between the lane and the left-hand roadway boundary are smaller than the predefined yaw angle limiting value.

6. The method as recited in claim 4, wherein, in the filtering step, the steering wheel angle signal is filtered using a low-pass filter in order to obtain the mean value.

7. The method as recited in claim 4, wherein, in the use step, the mean value is used after the steering wheel angle signal has been filtered over more than a minimum driving distance of the vehicle.

8. The method as recited in claim 1, further comprising:
   detecting surroundings of the vehicle using a video-based surroundings monitoring device; and
   detecting the curve of the roadway by analyzing images from a video camera of the surroundings monitoring device;
   wherein, in the filtering step, the steering angle signal is filtered and included in the determination of the mean value of the steering wheel angle signal when the detected curve of the roadway is detected as being curved to a lesser extent than a predefined curvature limiting value.

9. The method as recited in claim 1, wherein, in the filtering step, the steering wheel angle signal is filtered out from determining the mean value of the steering wheel angle signal when a drive through a tight turn is detected.

10. The method as recited in claim 1, wherein, in the filtering step, the steering wheel angle signal is filtered out from determining the mean value of the steering wheel angle signal when a lane change is detected.

11. A control device for compensating a steering wheel angle signal, which is subject to an offset, in a vehicle, the control device comprising:
    a controller including a processor configured to:
      filter the steering wheel angle signal while the vehicle is traveling, using a filtering rule, in order to determine a mean value of the steering wheel angle signal, wherein the steering wheel angle signal is filtered and included in the determination of the mean value only if at least one of (i) a lane along which the vehicle is to travel, and (ii) a roadway along which the vehicle is to travel, meets at least one predetermined criterion; and
      use the mean value to compensate the offset of the steering wheel angle signal.

12. A non-transitory, computer-readable data storage medium storing a computer program having program codes which, when executed on a computer, perform a method for compensating a steering wheel angle signal, which is subject to an offset, in a vehicle, the method comprising:
    filtering the steering wheel angle signal while the vehicle is traveling, using a filtering rule, in order to determine a mean value of the steering wheel angle signal, wherein the steering wheel angle signal is filtered and included in the determination of the mean value only if at least one of (i) a lane along which the vehicle is to travel, and (ii) a roadway along which the vehicle is to travel, meets at least one predetermined criterion; and
    using the mean value to compensate the offset of the steering wheel angle signal.

13. The control device as recited in claim 12, wherein the curve of the roadway is detected by analyzing images from a video camera of a video-based surroundings monitoring device of the vehicle.

* * * * *